June 7, 1932.  L. SANDLER  1,862,279
BEARING
Filed July 3, 1929   2 Sheets-Sheet 1

INVENTOR
Louis Sandler
by Byrnes, Stebbins & Parmelee,
Attys.

June 7, 1932.  L. SANDLER  1,862,279
BEARING
Filed July 3, 1929   2 Sheets-Sheet 2
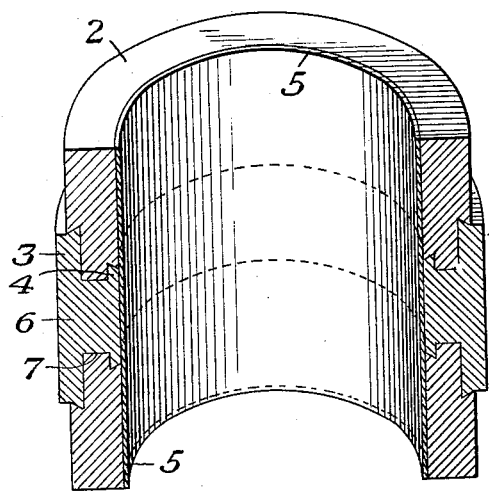
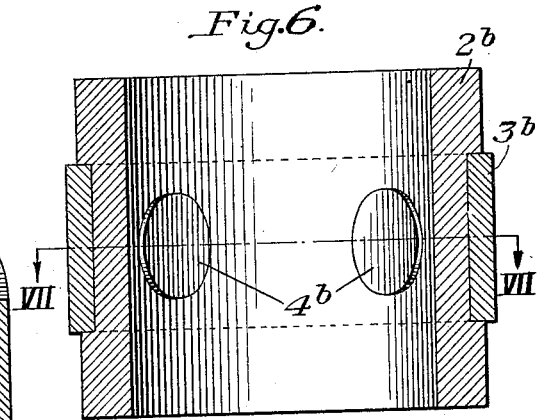
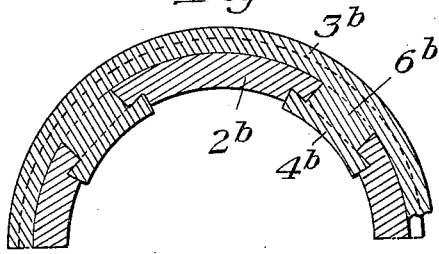
INVENTOR
Louis Sandler
by Byrnes, Stebbins & Parmelee
Attys.

Patented June 7, 1932

1,862,279

UNITED STATES PATENT OFFICE

LOUIS SANDLER, OF NEW CASTLE, PENNSYLVANIA, ASSIGNOR TO JOHNSON BRONZE COMPANY, OF NEW CASTLE, PENNSYLVANIA, A CORPORATION OF PENNSYLVANIA

BEARING

Application filed July 3, 1929. Serial No. 375,824.

This invention relates generally to bearings, and more particularly to bearings in which there is provided a shell of a relatively strong metal such as steel, to the outer surface of which is secured a section of a bearing metal.

In the patent to Gilman 1,581,083 there is disclosed a bearing adapted for use in V type engines such as the Liberty engine. In such type bearings it is advisable to form the shell or body of the bearing of a strong material such as steel and to secure bearing metal sections to the inner and outer surfaces of the shell. The inner bearing metal bears on the crankshaft, and the outer bearing metal forms a bearing for the crank end of the connecting rod. The bearing section provided on the outer surface of the steel shell ordinarily is ring-shaped and projects beyond the outer surface of the shell and forms a bearing surface for the inner connecting rod.

In the Gilman patent above referred to the bearing metal is secured to the outer surface of the steel shell by soldering it thereto. This method presents several disadvantages among which are that if the bearing becomes too hot in use, the solder becomes liquefied and the bearing metal is apt to become displaced from the steel shell. Another disadvantage is that solder is a comparatively good insulator, so that the provision of a layer of solder between the bearing metal and the steel shell prevents the heat from being readily dissipated. This tends to raise the temperature of the bearing so that the bearing metal liner will become loosened from the steel shell.

The present invention contemplates the production of a bearing useful for purposes similar to the bearing disclosed in the above referred to patent. I provide a bearing in which the bearing metal section is secured to the shell without resorting to any means such as soldering, but in which the bearing metal section is connected to the shell by pouring the bearing metal while in liquid condition and so forming the shell that the bearing metal will be securely locked to the shell.

In the accompanying drawings which illustrate several preferred embodiments of the invention Figure 1 is a vertical sectional view of a mold and a liner on the line I—I of Figure 2;

Figure 5 is a central vertical section of a completely finished bearing;

Figure 6 is a view similar to Figure 4, but showing a modification; and

Figure 7 is a section on the line VII—VII of Figure 6.

Figure 1:
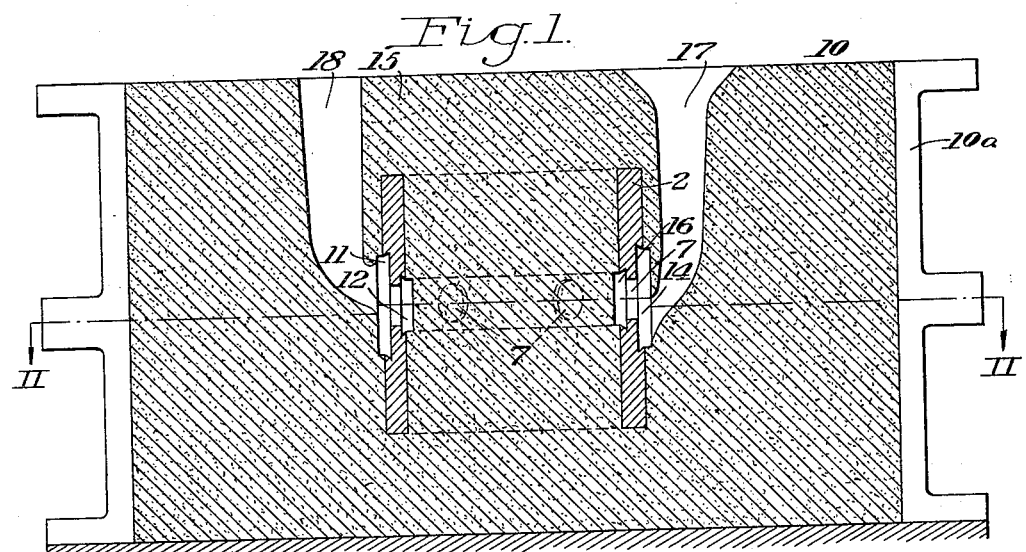
Figure 2:
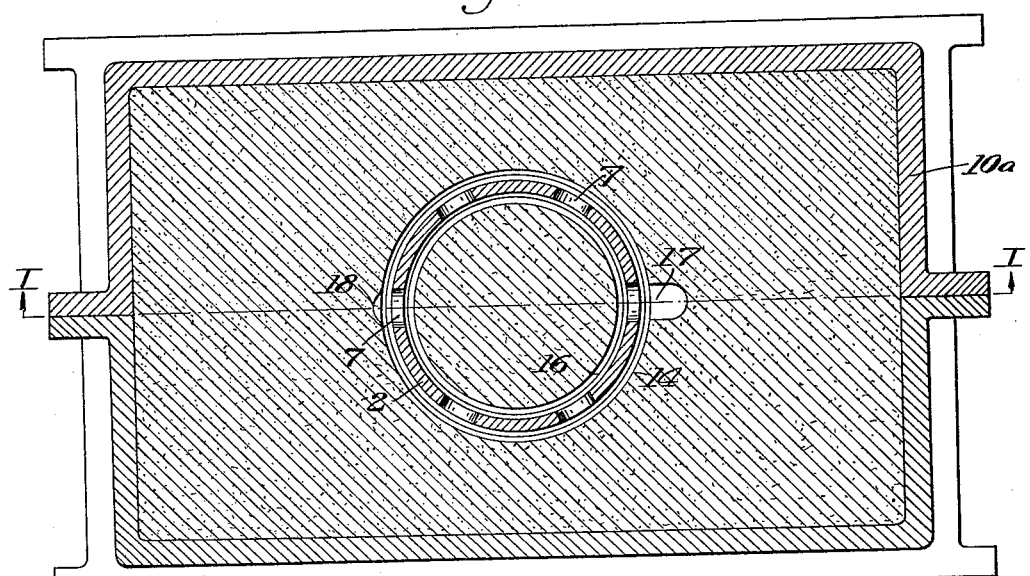
Figure 2 is a horizontal section on the line II—II of Figure 1.

Referring to the embodiment illustrated in Figures 1 to 5, there is shown a bearing having a steel shell 2, and an outer ring-shaped section 3 of bearing metal adapted to fit into a corresponding recess formed in the connecting rod. An inner ring-shaped section 4 of bearing metal is secured to the inner surface of the shell 2. An inner lining 5 of babbitt metal covers the whole inner surface of the shell 2. The outer section 3 and the inner section 4 of bearing metal are connected at spaced intervals by projections 6 of bearing metal extending through openings 7 formed in the shell 2.

The bearing is formed by pouring the bearing metal into a mold in which the shell 2 is arranged. As illustrated, a sand mold 10 may be provided by utilizing a two-part flask 10a. The cylindrical steel shell 2 is provided with an outer ring-shaped recess 11 and an inner ring-shaped recess 12. Openings 7 through the shell 2 are provided at spaced intervals in communication with the outer recess 11 and the inner recess 12. The mold 10 is so made as to provide a ring-shaped recess 14 extending around the shell 2 and in communication with the outer recess 11 formed in the shell. A core 15 is placed in the mold within the shell 2, the core being provided with a ring-shaped recess 16 communicating with the inner recess 12 in the shell 2. After the shell 2 and the core 15 have been arranged in the mold, bearing metal is poured into the pouring opening 17. The bearing metal flows into the outer recess 11 extending around the shell and flows through the openings 7 into the inner recess 12. A riser opening 18 is provided as is common practice, in order to produce sound castings.

Figure 4:
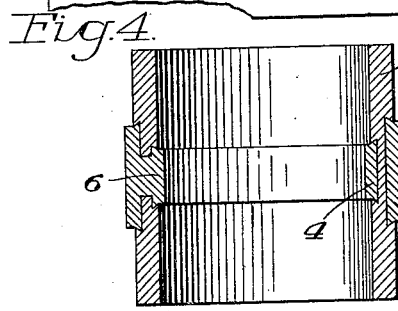
Fig. 4 is a section taken on the line IV—IV of Figure 3.
Figure 3:
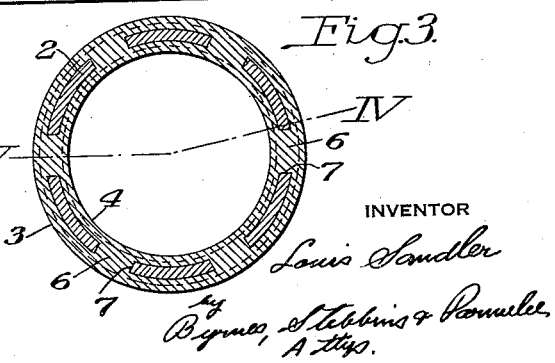
Figure 3 is a horizontal section of a bearing produced in the mold shown in Figures 1 and 2.

By this method of pouring in the bearing metal there is provided an outer ring-shaped section 3 of bearing metal and an inner ring-shaped section 4 of bearing metal which are tied together and locked to the shell 2 at spaced intervals by the projections 6 formed by the bearing metal flowing through the openings 7 provided in the shell. Figure 4 illustrates a bearing after being taken from the mold 10. The finished bearing, illustrated in Figure 5, is made by machining off the surface of the inner ring 4 so that it lies flush with the inner surface of the shell 2 and thereafter lining the inner surface of the shell with a layer 5 of babbitt metal. The outer surface of the shell and the surface of the outer bearing section 3 are ordinarily machined before covering the inner section of the shell with the babbitt lining 5.

A bearing constructed in accordance with my invention does not depend upon the use of any fastening material such as solder for securing the bearing metal section to the shell. The projections 6 of bearing metal, which connect the inner and outer rings 4 and 3, respectively, of bearing metal are of a good conducting material which rapidly dissipates heat generated at the bearing surfaces. The inner recess 12 and the outer recess 11 in the shell 2 are preferably dovetailed. After the bearing metal has been poured into these recesses, the dovetailed shape acts as an additional securing means to prevent any possible displacement of the bearing sections relative to the shell 2.

In the modification illustrated in Figures 6 and 7 there is an outer section 3b of bearing metal which is connected at spaced points by bearing metal projections 6b which extend through the shell 2b and are connected at their inner ends to buttons 4b of bearing metal. This embodiment of the invention differs from the embodiment shown in Figure 4 only in that instead of a ring-shaped inner section 4 of bearing metal, in the present modification the inner section 4b is not continuous to form a ring, but simply forms buttons 4b which are imbedded in the inner surface of the shell 2b. The buttons 4b lock the outer bearing section 3b in a manner similar to the inner ring-shaped section 4 shown in Figure 4. The bearing is formed by pouring bearing metal into a mold containing the shell 2b, in the manner already described.

In all of the embodiments illustrated and described, the bearing sections are locked to the shell by pouring the bearing metal into a mold containing the shell, the shell being provided with recesses and openings which are filled by the bearing metal and which securely lock the bearing sections to the shell.

I have illustrated and described several preferred embodiments of the invention. It is to be understood, however, that the invention may be otherwise embodied or practiced within the scope of the following claims.

I claim:

1. A bearing comprising a shell having recesses in its outer and inner surfaces, the shell having spaced openings extending therethrough and communicating with the recesses, and outer and inner sections of bearing metal in the recesses, said outer and inner sections being connected to each other and locked to the shell.

2. A bearing comprising a shell having circumferential dovetailed recesses in its outer and inner surfaces, the shell having spaced openings extending therethrough and communicating with the recesses, and outer and inner sections of bearing metal in the recesses, said outer and inner sections being connected to each other and locked to the shell.

3. A bearing comprising a shell having recesses in its outer and inner surfaces, the shell having spaced openings extending therethrough and communicating with the recesses, and outer and inner sections of bearing metal in the recesses, said outer and inner sections being conected to each other and locked to the shell, the outer section being of less width than the width of the shell in a direction axially of the bearing.

In testimony whereof I have hereunto set my hand.

LOUIS SANDLER.